United States Patent
Webster et al.

(10) Patent No.: US 6,209,794 B1
(45) Date of Patent: Apr. 3, 2001

(54) METHOD FOR DESIGNING A VEHICLE THERMAL MANAGEMENT SYSTEM

(75) Inventors: Bruce Eugene Webster, Plymouth; Thomas Paul Glelda, Brighton, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/376,101

(22) Filed: Aug. 17, 1999

(51) Int. Cl.[7] ..................................................... G05D 23/00
(52) U.S. Cl. .......................... 236/94; 236/78 B; 700/276
(58) Field of Search ..................................... 236/94, 46 R, 236/49.3, 78 B; 165/202, 203, 204, 11.1; 700/276, 277, 278, 300, 29, 30, 31; 62/126, 127, 129, 130

(56) References Cited

U.S. PATENT DOCUMENTS

| | | | |
|---|---|---|---|
| 4,912,657 | 3/1990 | Saxon et al. | 364/518 |
| 5,070,534 | 12/1991 | Lascelles et al. | 395/155 |
| 5,111,413 | 5/1992 | Lazansky et al. | 364/578 |
| 5,170,935 | * 12/1992 | Federspiel et al. | 700/276 |
| 5,197,120 | 3/1993 | Saxton et al. | 395/139 |
| 5,197,666 | * 3/1993 | Wedekind | 236/78 B |
| 5,291,748 | * 3/1994 | Ueda | 236/78 B |
| 5,293,479 | 3/1994 | Quintero et al. | 395/161 |
| 5,799,293 | 8/1998 | Kaepp | 706/45 |
| 5,988,517 | * 11/1999 | Bauer et al. | 236/49.3 |

OTHER PUBLICATIONS

SAE Recommended Practice, "Passenger Car Windshield Wiper Systems–SAE J903c", Nov. 1973.
SAE Recommended Practice, "Motor Vehicle Driver And Passenger Head Position–SAE J1052", May 1987.
SAE Recommended Practice, "Driver Hand Control Reach–SAE J287", Jun. 1988.
SAE Recommended Practice, "Passenger Car Glazing Shade Bands–SAE J100", Mar. 1988.
SAE Recommended Practice, "Accommodation Tool Reference Point–SAE J1516", Mar. 1990.
SAE Recommended Practice, "Driver Selected Seat Position–SAE J1517", Mar. 1990.
SAE Recommended Practice,"Truck Driver Shin–Knee Position For Clutch And Accelerator–SAE J1521", Mar. 90.
SAE Recommended Practice, "Truck Driver Stomach Position–SAE J1522", Mar. 1990.
SAE Standard,"Devices For Use In Defining And Measuring Vehicle Seating Accomodation–SAE J826", Jun. 1992.
SAE Recommended Practice, "Motor Vehicle Drivers' Eye Locations–SAE J941", Jun. 1992.
SAE Recommended Practice, "Passenger Car Windshield Defrosting Systems–SAE J902", Apr. 1993.
SAE Recommended Practice, "Windshield Wiper Systems–Trucks, Buses, And Multipurpose Vehicles–SAE J198", Jun. 1993.
SAE Recommended Practice, "Motor Vehicle Dimensions–SAE J1100", Jun. 1993.
SAE Recommended Practice, " Describing And Measuring The Driver's Field Of View–SAE J1050", Aug. 1994.

* cited by examiner

Primary Examiner—Harry B. Tanner
(74) Attorney, Agent, or Firm—Larry I. Shelton

(57) ABSTRACT

A method for designing a thermal management system on a vehicle includes the steps of determining a parametric solid model of a vehicle and determining an exterior thermal output of the vehicle from the parametric solid model of the vehicle. The method also includes the steps of determining a parametric solid model of an interior thermal management system on the vehicle and determining an interior thermal output within the vehicle, from the parametric solid model of the interior thermal management system and the external thermal output of the vehicle.

7 Claims, 5 Drawing Sheets

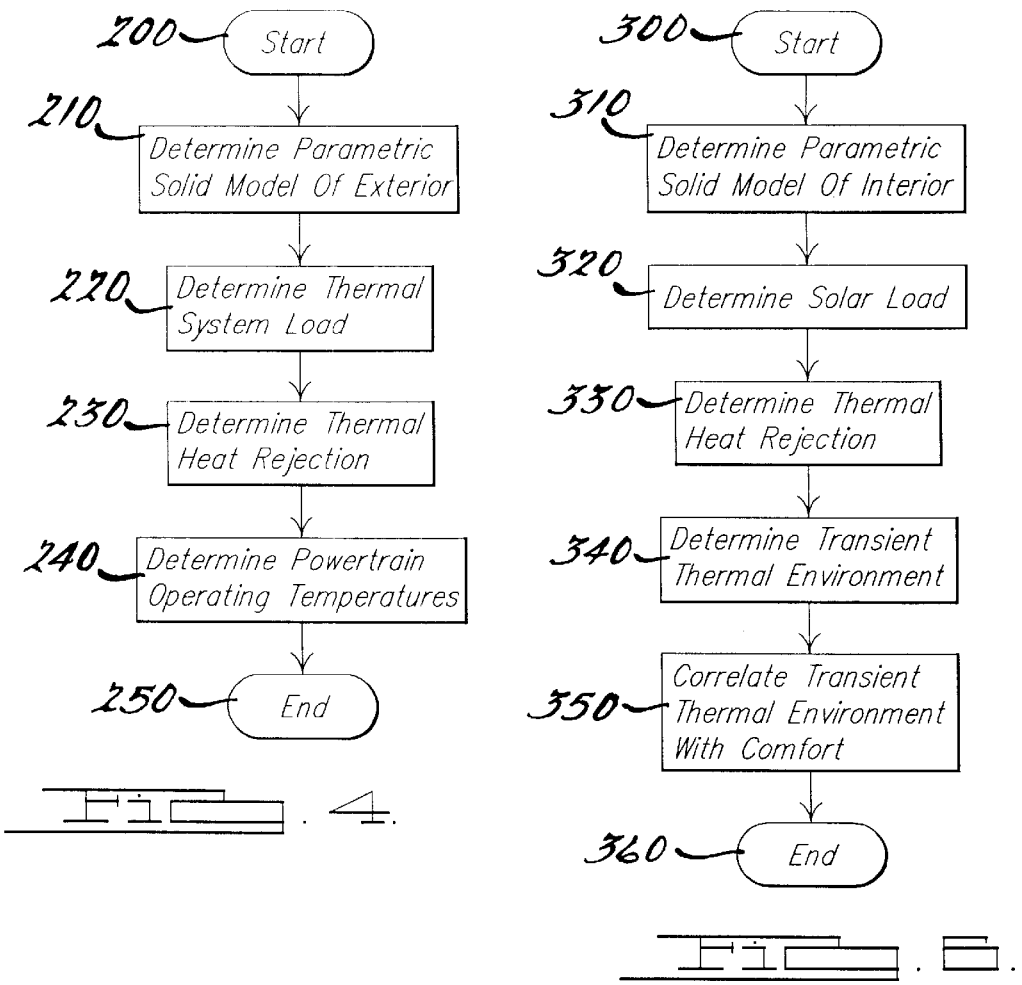
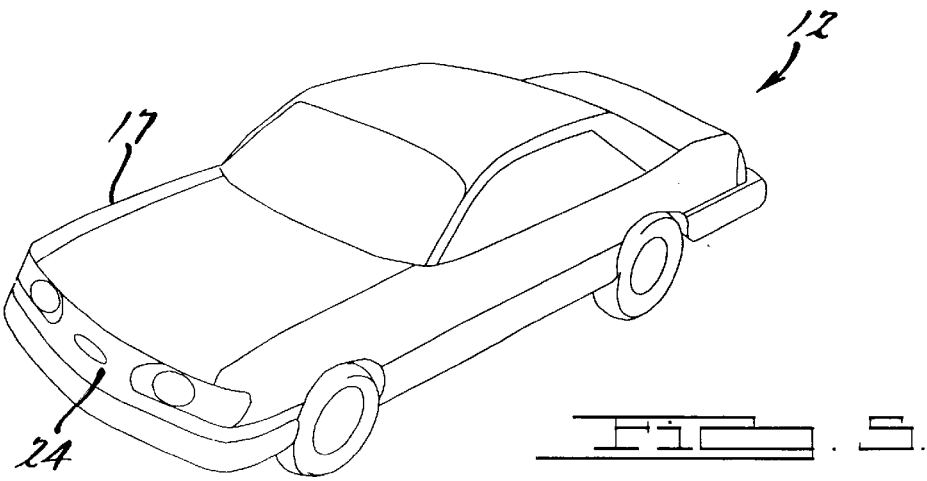

METHOD FOR DESIGNING A VEHICLE THERMAL MANAGEMENT SYSTEM

BACKGROUND OF THE INVENTION

1. Field of the Invention

The present invention relates generally to computer-aided design of vehicles and, more specifically, to a method for designing a thermal management system of a vehicle.

2. Description of the Related Art

Vehicle design, and in particular automotive vehicle design, has advanced to a state in which computer-aided design techniques are frequently utilized to develop a new vehicle in a virtual environment. Computer-aided design is especially beneficial in optimizing the various systems incorporated within a vehicle, to maximize design and functional capabilities of the vehicle systems. One example of a vehicle system is a thermal management system, providing powertrain cooling and climate control. The powertrain cooling system maintains the temperature within an engine compartment of the vehicle. The climate control system maintains the temperature of an occupant compartment of the vehicle at a comfortable level by providing heating, cooling and ventilation.

One aspect of the design task for a vehicle system, such as the thermal management system, is to ensure that the system is spatially compatible with a particular environment. Another aspect of the design task is to ensure that the design complies with predetermined functional criteria, including performance and durability requirements. In the past, various methods have been utilized to determine whether a proposed design meets such predetermined parameters. For example, a proposed design may be analyzed in two dimensions, which requires many iterations of a drawing. A three-dimensional model may also be constructed to obtain a better perspective of the design. The three-dimensional model may further be subjected to testing to determine whether it complies with performance and durability criteria. This method is time consuming and expensive.

It is also known that design methods that are knowledge-based are being utilized to design a vehicle system. The knowledge-based design method provides advice to the user of the method based on the environment of the design application used. Advantageously, knowledge-based design techniques maximize the amount of knowledge utilized, while developing a new vehicle system in a minimal period of time. An example of a knowledge-based design technique is disclosed in U.S. Pat. No. 5,799,293 to Kaepp, entitled "Method For Optimizing The Design Of A Product Using Knowledge Based Engineering Techniques", the disclosure of which is hereby incorporated by reference.

It is also known to use a computer-aided design technique to design a vehicle system. An example of a computer aided design technique is disclosed in U.S. patent application Ser. No. 08/984,806, entitled "Method and System For Vehicle Design Using Occupant Reach Zones", the disclosure of which is hereby incorporated by reference. Another example is disclosed in commonly assigned U.S. patent application, Ser. No. 09/356,576, entitled "Method For Designing A HVAC Air Handling Assembly For A Climate Control System," the disclosure of which is hereby incorporated by reference.

While the above design techniques work well, they do not take into account the particular functional and comfort criteria associated with designing a thermal management system for a vehicle. Therefore, there is a need in the art to provide a method for designing a thermal management system for a vehicle using a computer aided design and engineering technique that optimizes thermal performance and maximizes passenger thermal comfort criteria.

SUMMARY OF THE INVENTION

Accordingly, the present invention is a method for designing a thermal management system for a vehicle. The method includes the steps of determining a parametric solid model of a vehicle and determining an exterior thermal output of the vehicle from the parametric solid model of the vehicle. The method also includes the steps of determining a parametric solid model of an interior thermal management system of the vehicle and determining an interior thermal output within the vehicle, from the parametric solid model of the interior thermal management system and the external thermal output of the vehicle.

One advantage of the present invention is that an improved method of designing a thermal management system for a vehicle is provided that considerably reduces design time and related expenses. Another advantage of the present invention is that a method of designing a thermal management system for a vehicle is provided that considers both external vehicle and interior vehicle thermal management criteria. Yet another advantage of the present invention is that a method of designing a thermal management system for a vehicle is provided that allows analysis of an occupant's thermal comfort early in the design process. Still another advantage of the present invention is that a method of designing a thermal management system for a vehicle is provided which supports computer-aided engineering analysis (CAE) and rapid prototyping. A further advantage of the present invention is that a method of designing a thermal management system for a vehicle is provided which enhances informed decision making regarding the design in furtherance of vehicle timing considerations. Yet a further advantage of the present invention is that a method of designing thermal management system for a vehicle is provided that enhances flexibility in system design, while still meeting vehicle timing considerations. Still a further advantage of the present invention is that a method of designing a thermal management system for a vehicle is provided that utilizes parametric automated design in light of predetermined criteria.

Other features and advantages of the present invention will be readily appreciated, as the same becomes better understood after reading the subsequent description taken in conjunction with the accompanying drawings.

BRIEF DESCRIPTION OF THE DRAWINGS

FIG. 4 is a flowchart of a method for designing an exterior thermal management system for a thermal management system on a vehicle, according to the present invention.

FIG. 5 is a parametric model of a vehicle, according to the present invention.

FIG. 6 is a flowchart of a method for designing an interior thermal management system for a thermal management system on a vehicle, according to the present invention.

DESCRIPTION OF THE PREFERRED EMBODIMENT(S)

Vehicle design, and in particular the design of a thermal management system on a vehicle, is achieved according to the present invention with a generic parametric driven design process. Advantageously, this process allows flexibility in vehicle design and engineering analysis of the design in a fraction of the time required using conventional design methods. Various computer based tools are integrated to achieve this enormous time and expense savings, including solid modeling, parametric design, automated studies and a non-parametric components library, also referred to as a standard parts library.

Figure 1:
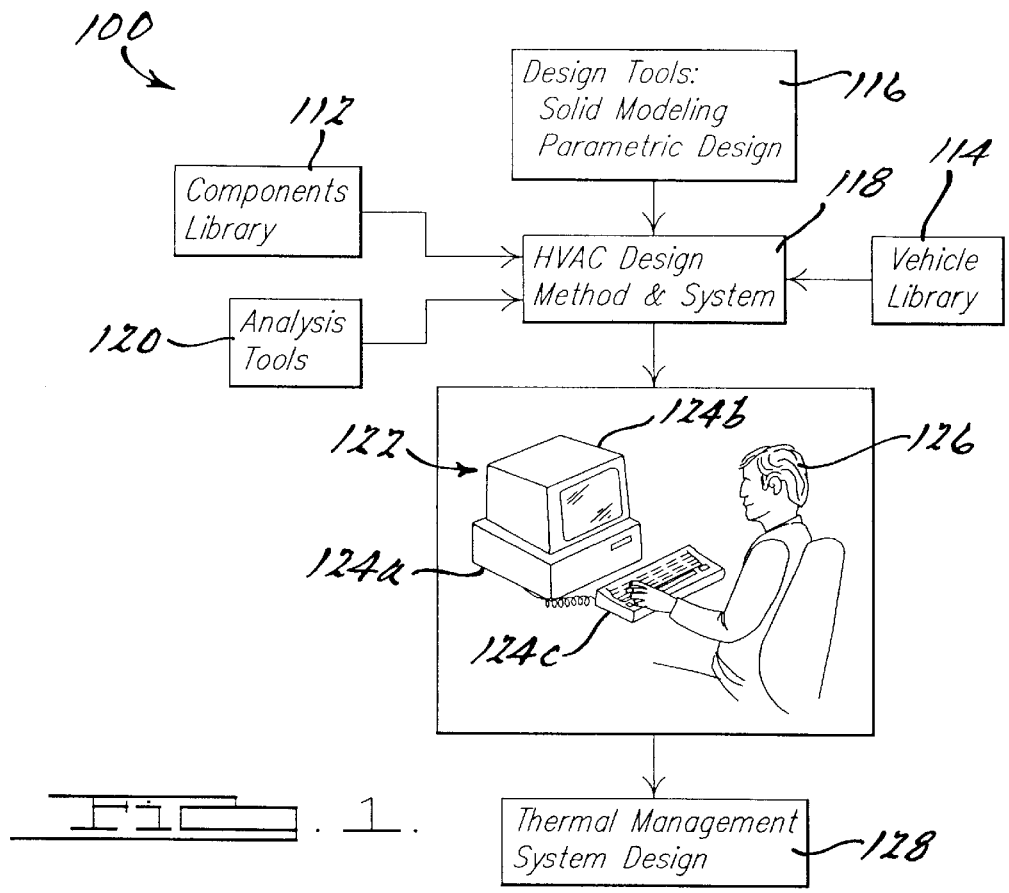
FIG. 1 is a block diagram of a system which may be utilized with a method for designing a thermal management system on a vehicle, according to the present invention.

Referring to the drawings and in particular FIG. 1, the tools 100 used by a method for designing a thermal management system on a vehicle, according to the present invention, is illustrated graphically. The tools 100 include a component parts library 112 stored on an electronic storage device (not shown). The component parts library 112 is a database providing an electronic representation of various types of component parts used on a thermal management system on a vehicle, to be described. The component parts library 112 also includes information in electronic form regarding various types of thermal management system architectures, to be described. Studies of these component parts can be done to assess the thermal management capabilities of the system.

The tools 100 also include a vehicle library 114 stored on the electronic storage device. The vehicle library 114 is an electrical representation of a vehicle model or a portion thereof. For example, the vehicle library 114 may include information regarding an occupant compartment portion of the vehicle. It should be appreciated that the vehicle library 114 and component parts library 112 may be stored on the same electronic storage device.

The tools 100 may also include various design tools, shown generally at 116, which can be used for this design method, to be described. These design tools 160 may include solid modeling and parametric design techniques. Solid modeling, for example, takes electronically stored vehicle model data from the vehicle library 140 and standard component parts data from the component parts library 120 and builds complex geometry for part-to-part or full assembly analysis. Several modeling programs are commercially available and generally known to those skilled in the art.

The parametric design technique is used in the electronic construction of vehicle geometry within a computer system 122 (to be described) for designing a vehicle system, such as the thermal management system. As a particular dimension or parameter is modified, the computer 124 is instructed to regenerate a new vehicle or part geometry. The parametric thermal management system information, generally indicated at 114, control and limit the design process in accordance with predetermined design parameters.

The tools 100 also include various computer-aided engineering (CAE) analytical methods 120. One example of an engineering analysis technique is computational fluid dynamics (CFD), to be described. Another example of an engineering analysis technique is a solar load prediction model, to be described. Yet another example is an air conditioning simulation model, to be described. Still yet another example is an objective to subjective comfort model, to be described.

The tools 100 further include a computer system 122 as is known in the art to implement the method. The computer system 122 includes a processor and a memory 124a, which can provide a display and animation of a system, such as the thermal management system, on a display such as a video terminal 124b. Parametric selection and control for the design can be achieved by a user 126, via a user interactive device 124c, such as a keyboard or a mouse. The user 126 inputs a set of parameters and set of instructions into the computer 124a when prompted to do so. The set of parameters and the set of instructions may be product specific, wherein other data and instructions non-specific to the product may already be stored in the computer 124a.

One example of an input method is a pop-up window with all current parameters, including an on-line description for the parameter and a current value therefore. For example, parametric values may be chosen from a table within a two-dimensional mode, since some vehicle designers prefer to view an assembly in sections which can be laid out on a drawing.

Once the computer system 122 receives the set of parameters and instructions from the user 126, and any information regarding related vehicle systems and information from the libraries 112, 114, the computer system 122 utilizes a method, discussed in detail subsequently, to determine whether requirements have been met.

Advantageously, the computer implemented method of designing a thermal management system 118 combines all of the foregoing to provide an efficient, flexible, rapid design thermal management system 128 for a thermal management system on a vehicle. Further, the thermal management system design 128 is an output of the method and the thermal management system design 128 is available for further analysis and study.

Figure 2:
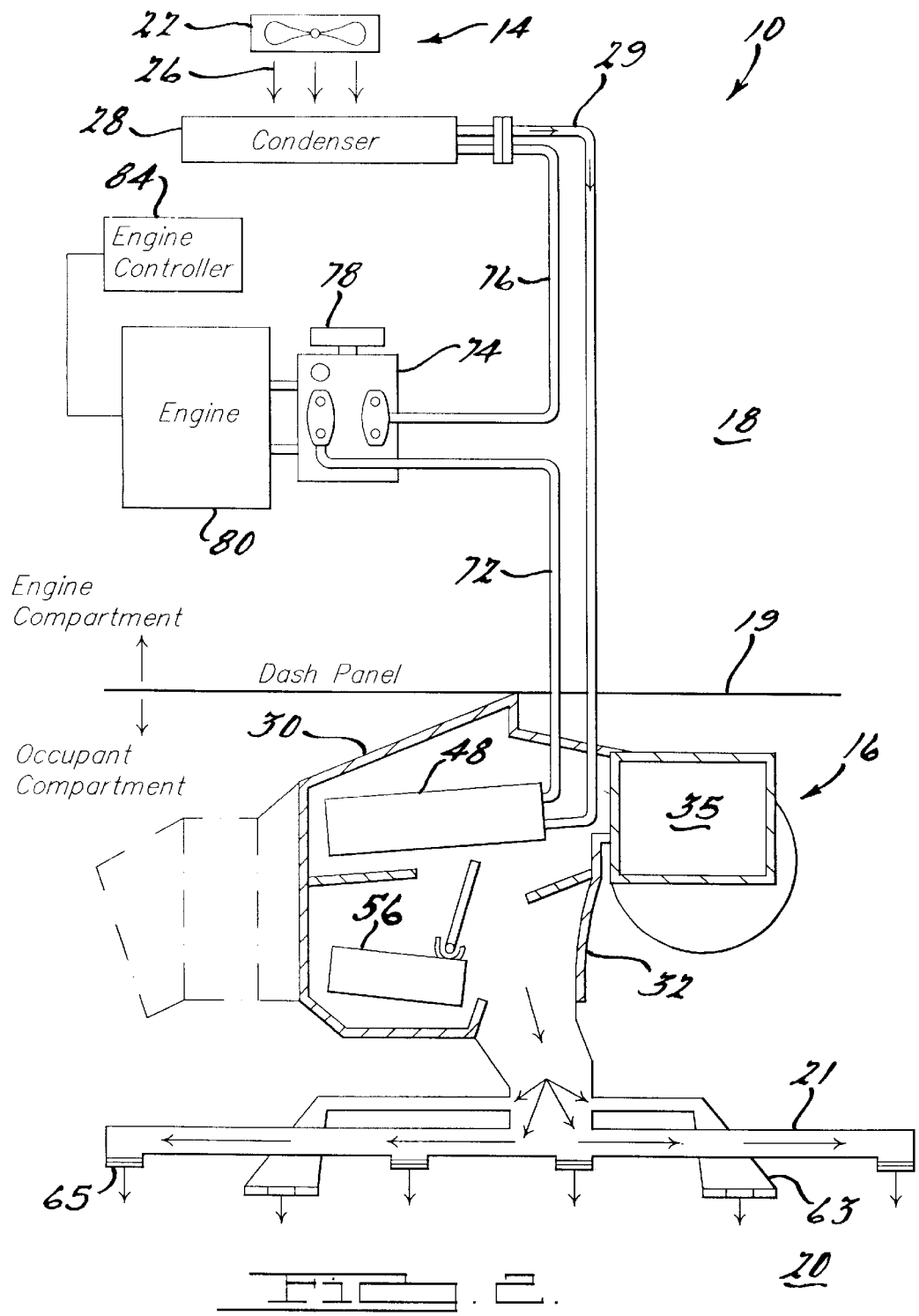
FIG. 2 is a block diagram of a thermal management system for a vehicle, according to the present invention.
Figure 3:
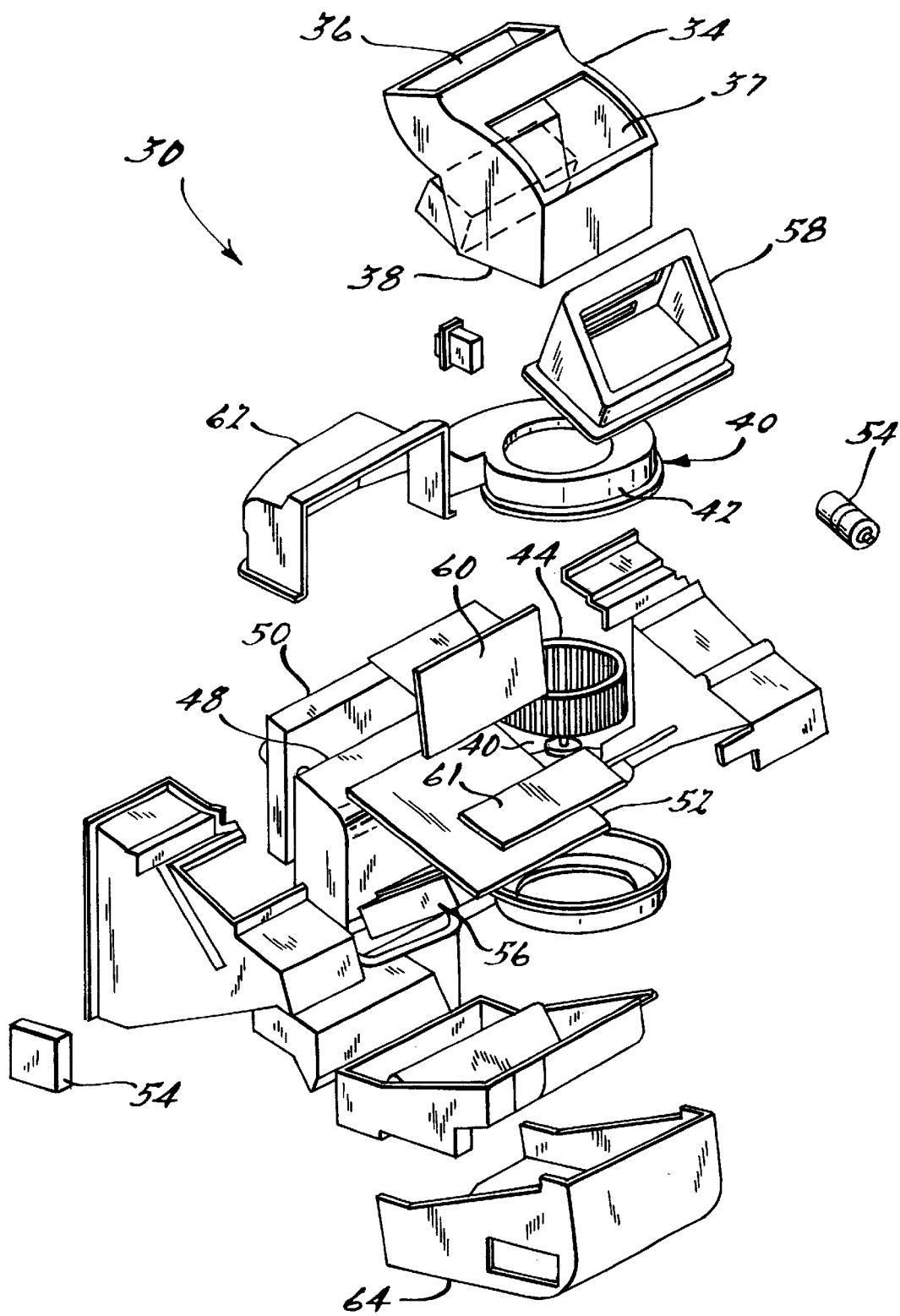
FIG. 3 is an exploded view of an HVAC assembly for the thermal management system of FIG. 2.

Referring to FIGS. 2, 3 and 5, a thermal management system 10 on a vehicle 12 is illustrated. The thermal management system 10 includes an exterior thermal management system 14 and an interior thermal management system 16 also referred to as a climate control system. The interior thermal management system 16 generally provides for heating, ventilation and air conditioning of an occupant compartment 20 of the vehicle 12. The exterior thermal management system 14 provides for powertrain cooling for an engine compartment 18 of the vehicle 12, in a manner to be described. It should be appreciated that, in this example, the thermal management of the heating, cooling and ventilation functions is integrated into one system. Advantageously, the interior thermal management system 16 provides for a comfortable interior temperature of the occupant compartment 20, and good visibility through the windshield and other windows of the vehicle. It should be appreciated that the interior temperature of the vehicle 12 may be affected by factors such as occupant compartment temperature, ambient temperature, external air flow and heat radiation.

The thermal management system 10 includes a fan 22 positioned behind a front grill 24 portion of the vehicle 12. The fan 22 draws air 26 from outside the vehicle 12 into the engine compartment 18 to provide cooling of powertrain components, such as the engine 80 and transmission (not shown). The thermal management system 10 also includes a radiator (not shown) positioned behind the front grill 24 to provide powertrain cooling.

The thermal management system 10 further includes a condenser 28 positioned behind the front grill 24. The condenser 28 facilitates a thermodynamic reaction therein between air, such as air 26 drawn in by the fan 22, and a refrigerant 29 in a gaseous state, whereby the refrigerant 29 changes from a gas to a liquid through the transfer of heat from the refrigerant 29 to the air 26. The heated air is vented to the outside air, preferably at a constant pressure, and the refrigerant 29, now in a liquid state, flows from the condenser 28 into the interior thermal management system 16 as will be described.

The interior thermal management system 16 also includes an air-flow handling system, referred to in the art as a heating, ventilation and air conditioning (HVAC) assembly 30. The HVAC assembly 30 conditions a flow of air by heating or cooling the airflow and distributing the flow of conditioned air to the interior of the occupant compartment of the vehicle 12. It should be appreciated that, in this example, the HVAC assembly 30 is positioned on the occupant compartment 20 side of a dash panel 19, below an instrument panel, partially shown at 21. Also, in this example, the HVAC assembly 30 includes a case 32, having a preferred architecture, to package the individual component parts of the HVAC assembly 30, to be described.

The HVAC assembly 30 includes an air inlet duct 34. The air inlet duct 34 is generally a rectangular member, and includes an interior chamber 35 that is hollow, for receiving air to be conditioned. The air inlet duct 34 includes an inlet opening to allow the ingress of air to be conditioned into the interior chamber 35. The air inlet duct 34 receives air from outside of the vehicle 12, or recirculated air from inside the occupant compartment 20 of the vehicle 12.

In this example, there is an outside air inlet opening 36 for receiving outside air, such as through a vent located near a windshield portion of the vehicle 12 and an inside air inlet opening 37 for receiving recirculated air from the occupant compartment 20. Preferably, the openings 36,37 are covered by a door (not shown) that operably controls the ingress of air. The interior chamber 35 is both actuable between a position whereby one hundred percent outside air and no recirculated air is drawn into the interior chamber 35, and another positioned whereby one hundred percent (100%) recirculated air is drawn into the interior chamber 35 and no outside air. Further, the vent and door may be partially open to allow a mixture of outside air and recirculated air to be drawn into the chamber 35.

It should be appreciated that the size of the air inlet duct 34 and position relative to the case 32 is part of an HVAC assembly architecture. The air inlet duct 34 also includes an egress opening 38 for the air to leave the interior chamber 35 of the air inlet duct 34.

The HVAC assembly 30 also includes a blower assembly 40 operably connected to the egress opening 38 in the air inlet duct 34. The blower assembly 40 pulls air through the air inlet duct 34 and forces it through the rest of the HVAC assembly 30, in a manner to be described. The blower assembly 40 includes a scroll assembly 42 having a wheel 44 and a motor 46, as it is known in the art. Preferably, the motor 46 is part of a centrifugal blower function for the blower assembly 40.

The HVAC assembly 30 further includes an evaporator core 48 operably connected to the blower assembly 40, that receives the flow of air to be conditioned. Depending on the air conditioning mode selected, the flow of air to be conditioned is either outside air, or recirculated air from the occupant compartment 20. It should be appreciated that, in this example, there is a filter 50 positioned between the blower assembly 40 and the evaporator core 48, to filter the air before it passes through the evaporator core 48. The evaporator core 48 cools and dehumidifies the air to be conditioned, by the thermodynamic transfer of heat from the air to be conditioned to a refrigerant, as is known in the art. The now conditioned air exits the evaporator core 48 and is distributed in a manner to be described.

The HVAC assembly 30 also includes a blend door 52 that diverts the flow of conditioned air leaving the evaporator core 48 to adjust the temperature of the air. It should be appreciated that the blend door 52 may be actuated by an actuator 54. The actuator 54 may be electrically operated, mechanically operated, or vacuum operated, as is known in the art. The blend door 52 directs the flow of air either into a heater core 56, to be described, or to bypass the heater core 56, or partially through the heater core 56.

The HVAC assembly 30 includes a heater core 56 that receives a flow of air to be heated and a coolant fluid, which, in this example, is engine coolant as is known in the art. The heater core 56 heats the air by the thermodynamic transfer of heat from the coolant fluid.

The HVAC assembly 30 also includes an air mix door through which the flow of conditioned air from the evaporator core, or heater core, or a combination of both, exits the HVAC assembly 30. In this example, a first air mix door 60 operatively directs the flow of now conditioned air through a panel duct 63 in the instrument panel 21 and into the occupant compartment 20. A second air mix door 61 operatively directs the flow of conditioned air through a floor duct 64 positioned near the floor of the vehicle in the instrument panel 21. It should be appreciated that the first air mix door 60 can also divert air through a plenum 58 and a defroster duct 65.

In this example, the thermal management system 10 is typical of a vapor compression refrigerator cycle for a closed loop system, as is known in the art. The working fluid is the refrigerant 29, such as Freon. The refrigerant 29 leaves the evaporator core 48 as a gas and travels through a passageway 72 to a compressor 74 positioned in the engine compartment 18. The compressor 74, as is known in the art, operatively compresses the refrigerant 29 a predetermined amount to increase the pressure of the refrigerant 29. The refrigerant 29 is discharged from the compressor 74 and flows back to the condenser 28 via another passageway 76. The pressure of the refrigerant 29 as it is discharged from the compressor 74 is referred to as a head pressure. If the evaporator core 48 is removing more heat from the air to be conditioned than the thermal management system 10 can handle, the pressure of the refrigerant 29 leaving the evaporator core 48 increases. The refrigerant 29 enters the compressor 74 at an elevated pressure. If the discharge pressure is elevated, the pressure of the refrigerant 29 throughout the thermal management system 10 is elevated and the evaporator core 48 is not as efficient in removing heat from the air to be conditioned. As a result, the temperature of the cooled air may be higher than desirable to maintain an occupant comfort level.

The thermal management system 10 also includes a clutch 78 operatively connected to the compressor 74. The clutch 78 turns the compressor 74 on and off, as is understood in the art. The compressor 74 is also operatively connected to the engine 80. It should be appreciated that the engine 80, in this example, is an internal combustion engine capable of operating on a mixture of fuel (not shown) and air. The fuel and air enter the engine 80 through a fuel actuating mechanism (not shown), such as a throttle body, which meters the amount of fuel and air entering the engine 80.

The thermal management system 10 further includes an engine control mechanism 84, such as an engine controller, that is in communication with the engine 80. It should be appreciated that the engine control mechanism 84 is also in communication with the compressor 74 and the cooling fan 72 positioned in front of the engine 80.

The thermal management system 10 may also include an air bypass actuator (not shown) operatively connected to the fuel actuating mechanism. The air bypass actuator directs a flow of auxiliary air into the fuel actuating mechanism, in response to a signal from the engine control mechanism 84. An increase or decrease in auxiliary air regulates the speed of the engine 80 to compensate for fluctuations in engine speed. For example, engagement or disengagement of the compressor 74 while the engine 80 is at idle can induce a variance in engine speed.

Preferably, the thermal management system 10 includes other component parts, such as valves (not shown) and switches (not shown), which are conventional and well known in the art to operably transfer and condition the air flow.

Referring to FIG. 4, a flowchart of a method for designing the exterior thermal management system 14 using a computer-aided design and engineering technique, according to the present invention, is illustrated. The method provides for the design of an exterior thermal management system 14 with powertrain cooling as a primary performance criteria. Advantageously, the method optimizes the airflow around the front end of the vehicle 12 to minimize engine cooling and condenser airflow power requirements. The exterior thermal management system 14 also establishes convective heat transfer coefficients on a body portion of the vehicle 12 to determine a thermal resistance of the vehicle body structure 17. It should be appreciated that the method also determines temperature and the amount of air flow through the condenser to predict system performance.

The methodology begins in bubble 200, when it is called for by the user 126. The methodology advances to block 210 and determines a parametric model of an exterior portion of a vehicle body structure 17 using a design tool 116, such as parametric modeling and a database such as the component parts library 112 and the vehicle library 114. Advantageously, the vehicle library 114 may contain a parametric solid model of an exterior portion of a particular vehicle 12. In this example, the parametric model defines the shape of the outer surface of the vehicle 12, including a front grill 24 and radiator opening, as shown in FIG. 5.

Also, the vehicle library 114 may contain parameters defining various vehicles and vehicle system characteristics, such as interior size and vehicle body style. The component parts library 112 may contain a parametric solid model of a particular component part, as well as parameters defining characteristics of the component part. The user 126 may select the parameters that are relevant to the design of the exterior thermal management system 14. For example, a relevant vehicle system may include the condenser 28, fan 22, radiator and engine 80. The methodology advances to block 220.

In block 220, the methodology predicts a thermal load on the vehicle 12 using a computer aided engineering method 120, to determine the cooling requirements of the powertrain. The powertrain, including the engine 80 and transmission, reject energy at a specified rate and are cooled by the radiator and other cooling mechanisms (not shown) as is known in the art. The methodology advances to block 230.

In block 230, a further computer-aided engineering method 120 is used to determine a thermal heat rejection of the powertrain. For example, a computational fluid dynamic (CFD) analysis, as is known in the art, can be used to determine the thermal heat rejection.

In this example, the CFD analysis a Reynolds-Averaged Navier-Stokes (RANS) equation, as is known in the art. The RANS equations are a system of non-linear, partial differential equations that are parabolic in time and elliptic in space. To use the RANS equations, the physical domain of the vehicle exterior is subdivided into a plurality of tetrahedral cells. A system of ordinary differential equations is obtained by integrating at internal quadrature points over each cell volume. The CFD analysis utilizes a fully coupled finite element solution procedure to solve the incompressible thermally coupled RANS equations. The equations are then integrated over time through time-step sub-iterations. Advantageously, turbulence effects are simulated through the incorporation of another computer aided engineering method 120, the Spallart-Allmaras turbulence model, as is known in the art.

The methodology advances to block 240 and predicts a powertrain operating temperature for the exterior thermal management system 14, by correlating the thermal system load and the thermal heat rejection. The methodology advances to block 250 and ends.

Referring to FIG. 6, a flowchart of a method for designing the interior thermal management system 16 using a computer-aided design and engineering technique, according to the present invention, is illustrated. The method provides for the design of the interior thermal management system 16 with the occupant's thermal comfort as a primary performance criteria. Advantageously, the method optimizes the performance of the interior thermal management system 16 while maximizing occupant thermal comfort. Further, the method reduces the amount of time required to design and develop an optimal thermal management system. The method also utilized the predicted powertrain operating temperature from the method of designing the exterior thermal system to predict additional heat fluxes to the interior of the vehicle, such as from the exhaust system or catalytic converter.

The methodology begins in bubble 300, when it is called for by the user 126. The methodology advances to block 310 and determines a parametric model of the interior thermal management system 16 for a particular vehicle 12 using a design tool 116, such as parametric modeling and a database such as the component parts library 112 and the vehicle library 114. Advantageously, the vehicle library 114 may contain a parametric solid model of vehicle body structure 17 of a particular vehicle 12. Also, the vehicle library 114 may contain parameters defining various vehicles and vehicle system characteristics, such as interior size and vehicle body style. The component parts library 112 may contain a parametric solid model of a particular component part, as well as parameters defining characteristics of the component part. The user 126 may select the parameters that are relevant to the design of the interior thermal management system 16. For example, a relevant vehicle system may include the occupant compartment 20, the instrument panel 21 and the dash panel 19. The methodology advances to block 320.

In block 320, the methodology predicts a thermal load from a solar source (not shown) on the vehicle 12 using a computer aided engineering method, such as a solar load prediction model. The solar load prediction model determines the amount of the solar source's energy that is transmitted through a glass and sheet metal portion of the vehicle 12. Advantageously, a solar flux on each interior component can be determined from the solar load. The solar flux is the solar thermal load over a particular surface area of an interior component. The methodology advances to block 330.

In block 330 the methodology predicts the temperature of the air as it exits the ducts 63. For example, another computer aided engineering method 120, such as an air conditioning simulation model, predicts the temperature of the air entering the occupant compartment 20 when the thermal management system 10 is in an air conditioning mode. The air conditioning simulation model develops a transfer function which relates a temperature of the recirculated air entering the inside air inlet opening 37 versus a temperature of the air discharged from the ducts 63 into the occupant compartment 20. It should be appreciated that the transfer function is dependent on the powertrain operating temperature predicted by the method of the exterior thermal management system design. Alternatively, the transfer function can be determined from actual vehicle tests in a wind tunnel apparatus (not shown). Further, the transfer function can be determined from a relationship between an inlet air temperature and humidity, versus outlet air temperature and humidity, whereby the relationship is fit to a polynomial curve.

Still another computer aided engineering method 120, such as a heater simulation model, predicts the temperature of the air entering the occupant compartment 20 when the thermal management system 10 is in a heating mode. The heater simulation model determines the air temperature by calculating the outlet air temperature over time.

The methodology advances to block 340 and a further computer-aided engineering method 120 is used to determine a transient thermal environment within the occupant compartment 20 of the vehicle 12, which predicts how quickly the occupant compartment 20 will cool down to a predetermined temperature. For example, a computational fluid dynamic (CFD) analysis, as is known in the art, can be used to determine the transient thermal environment. Advantageously, the CFD analysis determines the velocity and temperature fields surrounding an occupant (not shown) in the vehicle 12. In this example, the occupant compartment 20 includes both fluid and solid elements to be analyzed by the CFD method. An example of a fluid element is air, while metal is an example of a solid element.

In this example, the CFD analysis used is a Reynolds-Averaged Navier-Stokes (RANS) equation as previously described. To use the RANS equations, the physical domain of the occupant compartment 20 is subdivided into a plurality of tetrahedral cells. A system of ordinary differential equations is obtained by integrating at internal quadrature points over each cell volume. Fluid and solid variables are defined at cell vertices, and fluxes are computed at cell faces.

The CFD analysis utilizes a fully coupled finite element solution procedure, as previously described, to solve the incompressible thermally coupled RANS equations. The equations are then integrated over time through time-step sub-iterations. Advantageously, turbulence effects are simulated through the incorporation of another computer aided engineering method 120, the Spallart-Allmaras turbulence model, as is known in the art. The methodology advances to block 350.

In block 350, the methodology correlates the transient thermal environment with a computer aided engineering method 120, such as a model of occupant comfort. In this example, the model of occupant comfort is derived from actual vehicle tests conducted within a wind tunnel or on a road. These tests predict a period of time for the occupant compartment 20 to reach a comfortable temperature when the thermal management system 10 is in either an air conditioning mode or a heating mode. It should be appreciated that a conjugate heat transfer analysis of a solid thermal mass inside the vehicle 12 may be included within the model to enhance the accuracy of the predicted temperatures. The methodology advances to block 360 and ends. It should also be appreciated that the interaction of the interior thermal management system 16 with these computer-aided engineering methods 120 can be communicated to the user 126, such as by reporting or displaying. For example, animation on a video screen 124b in three-dimension and in color can effectively communicate study results. Also, a printed report, including information such as the dimensional distance between the HVAC assembly 30, other vehicle systems, or vehicle, further communicates study results.

Figure 7:
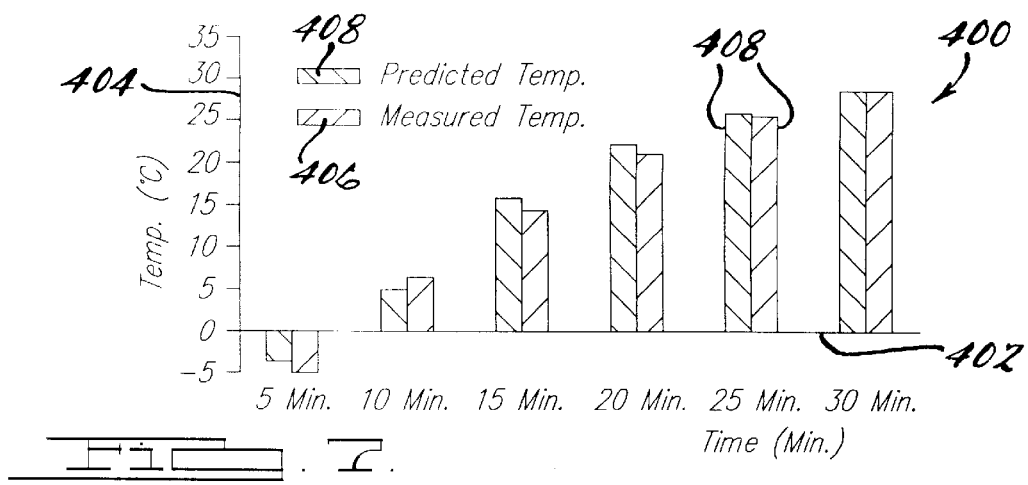
FIG. 7 is a graph of a predicted and a measured occupant compartment temperature for a vehicle.

Referring to FIG. 7, an example of a graph 400 comparing a predicted occupant compartment temperature to actual temperature data from a wind tunnel test of a vehicle 12 is illustrated. It should be appreciated that the temperature is evaluated over a period of time as shown by the x-axis at 402, and the temperature is measured in degrees Celsius, shown by the y-axis at 404. In this example, temperature is measured at a floor level in the vehicle 12 while the thermal management system 10 is in a heating mode, as shown at 406. A calculated floor level temperature predicted from the method of designing the interior thermal management system 16 is shown at 408.

Figure 8:
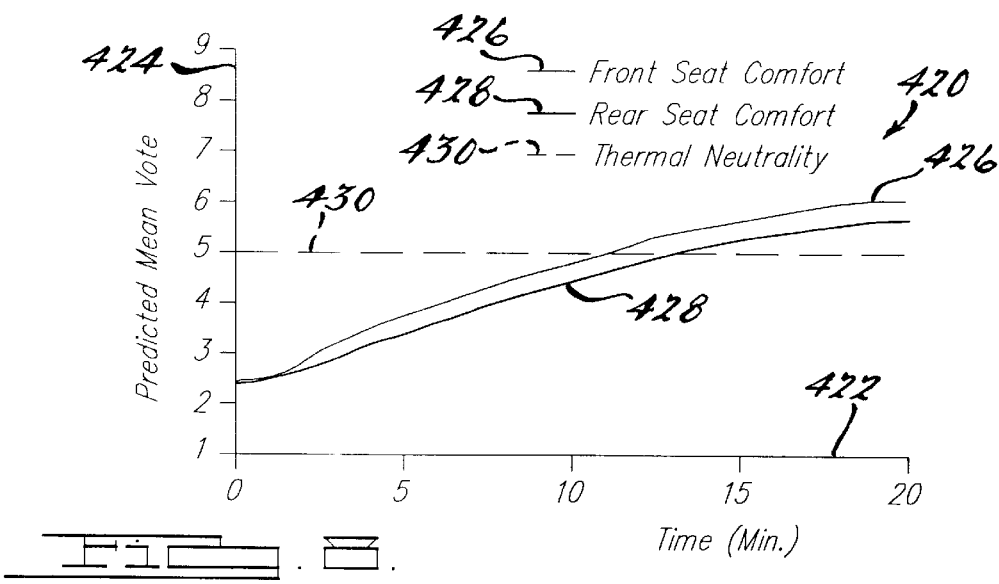
FIG. 8 is a graph of predicted interior vehicle thermal comfort during a heater performance test.

Referring to FIG. 8, an example of a graph 420 of a predicted time to reach a thermal comfort level for the occupant compartment 20 of a vehicle 12 is referenced to thermal neutral comfort level. In this example, temperature is measured during a heater performance test in a wind tunnel, as is known in the art. The heater performance test takes place over a period of time, shown on the x-axis at 422. The thermal comfort is measured subjectively on a scale of 1 to 9, with 1 being cold and 9 being hot, and 5 being the thermal neutral or the desired temperature as shown on the y-axis at 424. The predicted thermal comfort for a front seat is illustrated at 426, and can be compared with the predicted thermal comfort for a back seat as illustrated at 428, and thermal neutral at 430.

Figure 9:
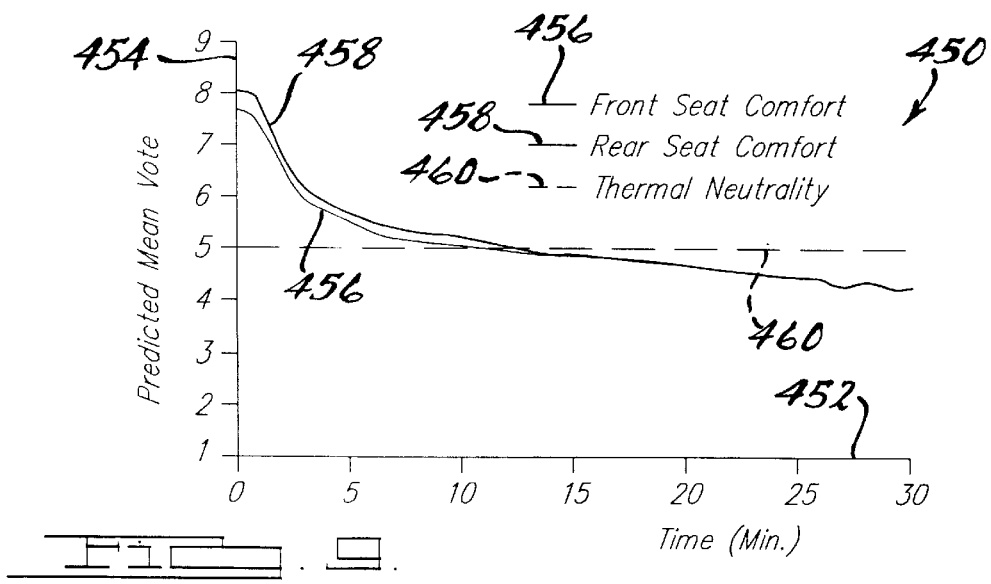
FIG. 9 is a graph of predicted interior vehicle thermal comfort during an air conditioning performance test.

Referring to FIG. 9, an example of a graph 450 of a predicted time to reach a thermal comfort level for the occupant compartment 20 of a vehicle 12 is referenced to the thermal comfort level. In this example, temperature is measured during an air conditioning performance test in a wind tunnel, as is known in the art. The air conditioning performance test takes place over a period of time, shown on the x-axis at 452. The thermal comfort is measured subjectively on a scale of 1 to 9, with 1 being cold and 9 being hot, and 5 being thermal neutral as shown on the y-axis at 454. The predicted thermal comfort for the front seat is illustrated at 456, and can be compared with the predicted thermal comfort for the back seat as illustrated at 458, and thermal neutral at 460.

Figure 10:
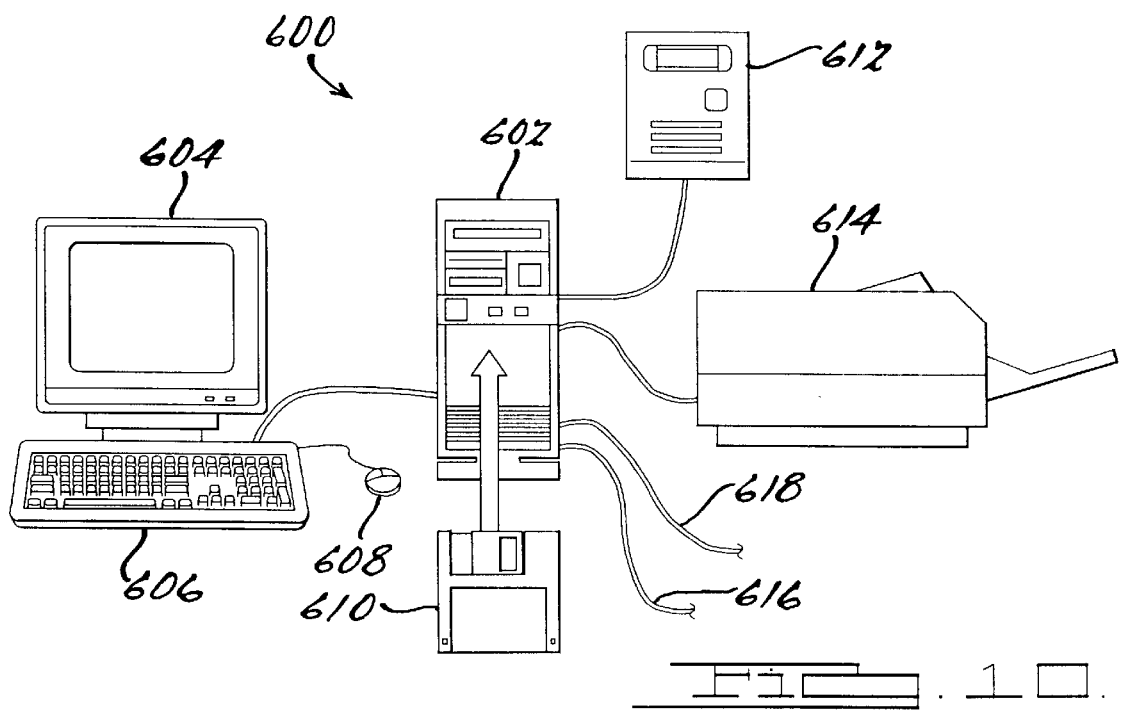
FIG. 10 is a view of a system for designing the thermal management system on a vehicle, according to the present invention.

Referring to FIG. 10, a representative system 600 for implementing the method for designing the exterior thermal management system 14 and the method for designing the interior thermal management system 16, according to the present invention, is illustrated. The system 600 includes a processing unit 602 connected to a user interface which may include a display terminal 604, a keyboard 606, a pointing device, such as a mouse 608, and the like. The processing unit preferably includes a central processing unit 602, a memory, and stored instructions which implement the method for designing the exterior thermal management system 14 and interior thermal management system 16, according to the present invention. The stored instructions may be stored within the processing unit 602 in the memory, or in any non-volatile storage such as magnetic or optical media, EPROM, EEPROM, or the like. Alternatively, instructions may be loaded from removal magnetic media 610, such as a removal disk, sometimes called a floppy disk, optical media 612, or the like. In a preferred embodiment, the system 600 includes a general-purpose computer program to implement the functions illustrated and described with reference to FIGS. 1–9. Of course, a system 600, according to the present invention, could also be embodied with a dedicated device which includes various combinations of hardware and software. The preferred embodiment may also include a printer 614 connected to the processing unit 602, as well as a network connection for accessing a local server, an intranet, and the Internet. Preferably, solid modeling software, parametric design software, surface rendering software, animation software, and the like are used for developing the system 600, according to the present invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for designing a thermal management system on a vehicle comprising:

determining a parametric solid model of a vehicle;

determining an exterior thermal output of the vehicle from the parametric solid model of the vehicle;

determining a parametric solid model of an interior thermal management system on a vehicle; and determining an interior thermal output within the vehicle, from the parametric solid model of the interior thermal management system and the external thermal output of the vehicle.

2. A method as set forth in claim 1 wherein the step of determining an exterior thermal output of the vehicle includes the steps of:

determining an external thermal load of the vehicle from the parametric solid model;

determining an external thermal heat rejection from the external thermal load; and determining an external thermal output of the vehicle from the external thermal heat rejection.

3. A method as set forth in claim 1 wherein the step of determining an interior thermal output includes the steps of:

predicting a solar load through a glass portion of the vehicle from the parametric solid model;

determining a relationship between conditioned air entering an occupant compartment and recirculated air leaving the occupant compartment;

determining a transient thermal environment in the occupant compartment from the solar load and the relationship between the conditioned air and recirculated air; and determining a human comfort level using the transient thermal environment.

4. A method as set forth in claim 3 including the step of comparing the calculated human comfort level to an actual human comfort level.

5. A method for designing an external thermal management system on a vehicle comprising:

selecting a parametric solid model of the vehicle;

determining an external thermal load of the vehicle from the parametric solid model;

determining an external thermal heat rejection from the external thermal load; and determining an external thermal output of the vehicle from the external thermal heat rejection.

6. A method for designing an internal thermal management system on a vehicle comprising:

selecting a parametric solid model of the vehicle;

predicting a solar load through a glass portion of the vehicle from the parametric solid model;

determining a relationship between conditioned air entering an occupant compartment and recirculated air leaving the occupant compartment;

determining a transient thermal environment in the occupant compartment from the solar load and the relationship between the conditioned air and recirculated air; and determining a human comfort level using the transient thermal environment.

7. A method as set forth in claim 6 including the step of comparing the calculated human comfort level to an actual human comfort level.

* * * * *